(12) United States Patent
Negri

(10) Patent No.: US 10,265,794 B2
(45) Date of Patent: Apr. 23, 2019

(54) METHOD OF MANUFACTURING METAL CONTAINERS

(71) Applicant: CNH Industrial America LLC, New Holland, PA (US)

(72) Inventor: Luca Negri, Aradeo (IT)

(73) Assignee: CNH Industrial America LLC, New Holland, PA (US)

(*) Notice: Subject to any disclaimer, the term of this patent is extended or adjusted under 35 U.S.C. 154(b) by 17 days.

(21) Appl. No.: 14/896,578

(22) PCT Filed: Jun. 5, 2014

(86) PCT No.: PCT/EP2014/061716
§ 371 (c)(1),
(2) Date: Dec. 7, 2015

(87) PCT Pub. No.: WO2014/195412
PCT Pub. Date: Dec. 11, 2014

(65) Prior Publication Data
US 2016/0107254 A1    Apr. 21, 2016

(30) Foreign Application Priority Data

Jun. 7, 2013 (IT) .............................. MO2013A0166

(51) Int. Cl.
| | | |
|---|---|---|
| *B23K 5/00* | (2006.01) | |
| *B65D 6/00* | (2006.01) | |
| *B23K 5/12* | (2006.01) | |
| *B23K 31/02* | (2006.01) | |
| *B23K 5/06* | (2006.01) | |
| *B23K 5/22* | (2006.01) | |
| *B23K 9/02* | (2006.01) | |
| *B65D 6/32* | (2006.01) | |
| *B23K 103/04* | (2006.01) | |

(Continued)

(52) U.S. Cl.
CPC .................. *B23K 5/12* (2013.01); *B23K 5/06* (2013.01); *B23K 5/22* (2013.01); *B23K 9/02* (2013.01); *B23K 31/02* (2013.01); *B65D 7/38* (2013.01); *B23K 2101/045* (2018.08); *B23K 2101/12* (2018.08); *B23K 2103/04* (2018.08)

(58) Field of Classification Search
None
See application file for complete search history.

(56) References Cited

U.S. PATENT DOCUMENTS 2,331,937 A * 10/1943 Schreiner ............... B23K 9/035
219/160
2,466,562 A    4/1949 Steinberger
(Continued)

FOREIGN PATENT DOCUMENTS

DE    102008024715 A1 * 11/2009    ........... B23K 33/006
DE    102010005863 A1    7/2011
(Continued)

*Primary Examiner* — Devang R Patel
(74) *Attorney, Agent, or Firm* — Peter K. Zacharias; Patrick M. Sheldrake

(57) ABSTRACT

A method of manufacturing a container includes positioning metals plates against one another to define an interior space, filling the interior space with a granular refractory material and welding the seams between the plates to form a fluid tight container.

7 Claims, 2 Drawing Sheets

(51) Int. Cl.
*B23K 101/04* (2006.01)
*B23K 101/12* (2006.01)

(56) References Cited

U.S. PATENT DOCUMENTS

| | | | | |
|---|---|---|---|---|
| 3,372,852 A | * | 3/1968 | Cornell | B23K 9/035 219/101 |
| 3,511,960 A | * | 5/1970 | De Haeck | B23K 9/035 219/137 R |
| 3,662,144 A | * | 5/1972 | De Haeck | B23K 9/035 219/137 R |
| 3,972,466 A | * | 8/1976 | Keith | B23K 9/0356 228/216 |
| 2007/0084906 A1 | * | 4/2007 | Vargas | B23K 33/004 228/119 |

FOREIGN PATENT DOCUMENTS

| | | | |
|---|---|---|---|
| JP | 53001659 A | * | 1/1978 |
| JP | S53127343 A | | 11/1978 |
| JP | 2005153015 A | | 6/2005 |

\* cited by examiner

METHOD OF MANUFACTURING METAL CONTAINERS

This application is the U.S. National Stage filing of International Application Serial No. PCT/EP2014/061716 filed on Jun. 5, 2014 which claims priority to Italian Application MO2013A000166 filed Jun. 7, 2013, each of which is incorporated herein by reference in its entirety.

FIELD OF THE INVENTION

The present invention relates to a method of manufacturing metal containers.

BACKGROUND OF THE INVENTION

It is known to manufacture metal containers, such as fuel tanks, from sheet metal plates, by positioning the plates against one another and butt welding the seams between the metal plates. The plates may be temporarily positioned against each other in any suitable manner, such as by means of clamps, jigs or tack welds. As a further possibility, the plates may be parts of a folded blank.

A problem that occurs when manufacturing a container in this manner is that weld spatter and burrs occur within the interior of the container. For certain applications, such defects are deemed to be unacceptable. Conventionally, welding defects may be removed by manual grinding after completion of the welding, but this task is labour intensive and therefore adds to the manufacturing costs.

It has previously been proposed to coat the interior of the container with an agent for preventing adhesion of weld spatter. The agent for preventing the adhesion of weld spatters s\is formed in JP2003290979 by mixing inorganic oxide particles and joining agents into a solvent. The agent is applied as a film to the weld zones and to the members near these zones. An air layers is formed between the spatters and the surface of the coating films which prevents heat retained in the spatters from being easily transferred to the coating films and the welding members, thereby preventing adhesion of the spatters.

SUMMARY OF THE INVENTION

According to the present invention, there is provided a method of manufacturing a container which comprises positioning metals plates against one another to define an interior space and welding the seams between the plates to form a fluid tight container, characterised in that the interior space is filled with a granular refractory material prior to the welding of the seams.

The granular refractory material preferably comprises chips or granules of crushed rock.

The granules may be angular or rounded.

If the granules are too fine, they may escape from or be trapped within the seam. If they are too large, on the other hand, they do not prevent large burrs of molten metal from being formed on the interior of the seams. In practice, it has been found that one may use granules ranging in size from 0.5 mm to 6 mm, granules in the range of 3 mm to 4 mm performing particularly well.

The material from which the granules are made is preferably marble as it has been found to have beneficial physical and chemical properties. In particular, marble does not react chemically with the molten metal, and is generally free from dust and moisture. Furthermore, its specific heat and thermal conductivity affect the cooling rate after welding is completed thereby reducing the time taken to complete the welding process.

A further advantage of filling the interior of the container with a granular material during welding is that it limits the quantity of air with which the molten metal can react and this has been found beneficial in avoiding porosity issues in the welds and reduces the risk of cracks.

While the method of invention is particularly suitable for the manufacture of steel tanks, such as fuel tanks and hydraulics tanks, it is also applicable to the welding of other metals, such as aluminium.

Further, other large welding assemblies, like the assembly of a boom or dipper stick of construction equipment, is also particular suitable for this method. The interior of these assemblies form an interior space that is difficult to clean mechanically but allows reception of the granular refractory material.

The method of the invention does not depend on the welding technique employed to melt metal and is applicable to arc welding (MIG or TIG welding) or oxy-acetylene welding.

The same granular refractory material may be used during several consecutive weldments. When the concentration of spatter becomes too high the weld spatter can be separated from the granular refractory material very easily to recycle.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
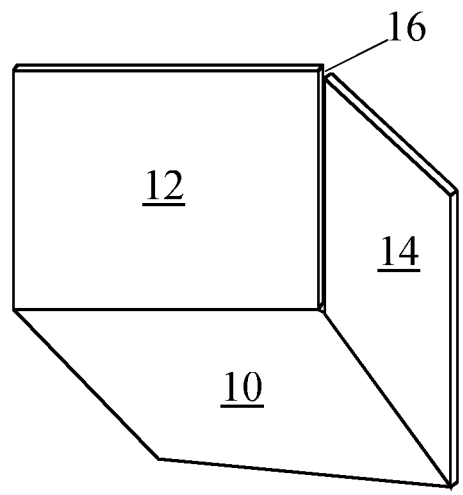
FIG. 1 is a schematic partial perspective view of a sheet metal blank that has been cut and folded to form two sides of a container that meet at a seam.
Figure 2:
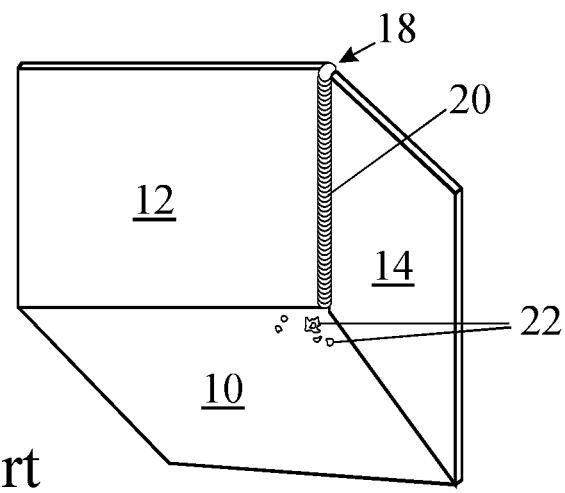
FIG. 2 shows the corner of a container in FIG. 1 after the seam has been welded.

FIG. 1 shows a sheet metal blank that has been cut and folded to form a base 10 and two upstanding walls 12 and 14 that meet at a seam 16. In FIG. 2, the same corner of the container is shown after the gap between the plates 12 and 14 has been sealed by means of a weld 18.

FIG. 2 shows some typically welding defects that may occur. The metal of the weld may bulge into the interior of the container forming a burr designated 20 in FIG. 2. Furthermore, there may be weld spatter 22 that adhere to the base 10 or to zones of the sides 12 and 14 that straddle the seam 16. As such defects are unacceptable in certain applications, they need to be ground away.

Figure 3:
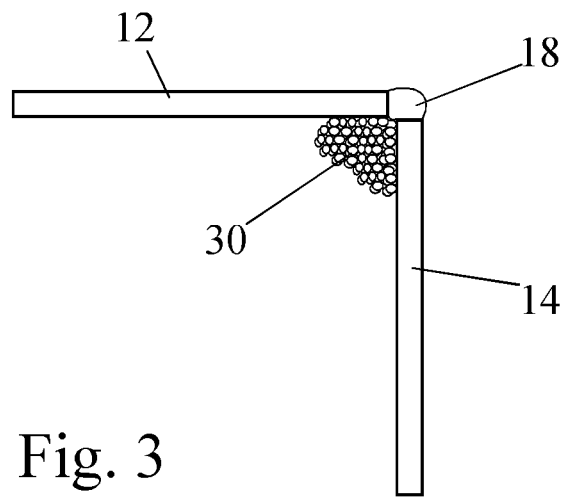
FIG. 3 is a schematic section through a corner of a container as it is being welded by the method of the invention.

To avoid the need for such repair of welding defects, in the present invention, as shown in FIG. 3, the interior of the container is filled with granules of a refractory material 30 during the welding process. The granules prevent the build-up of burrs and also catch any spatter before it can settle on any of the interior walls of the container.

Figure 4:
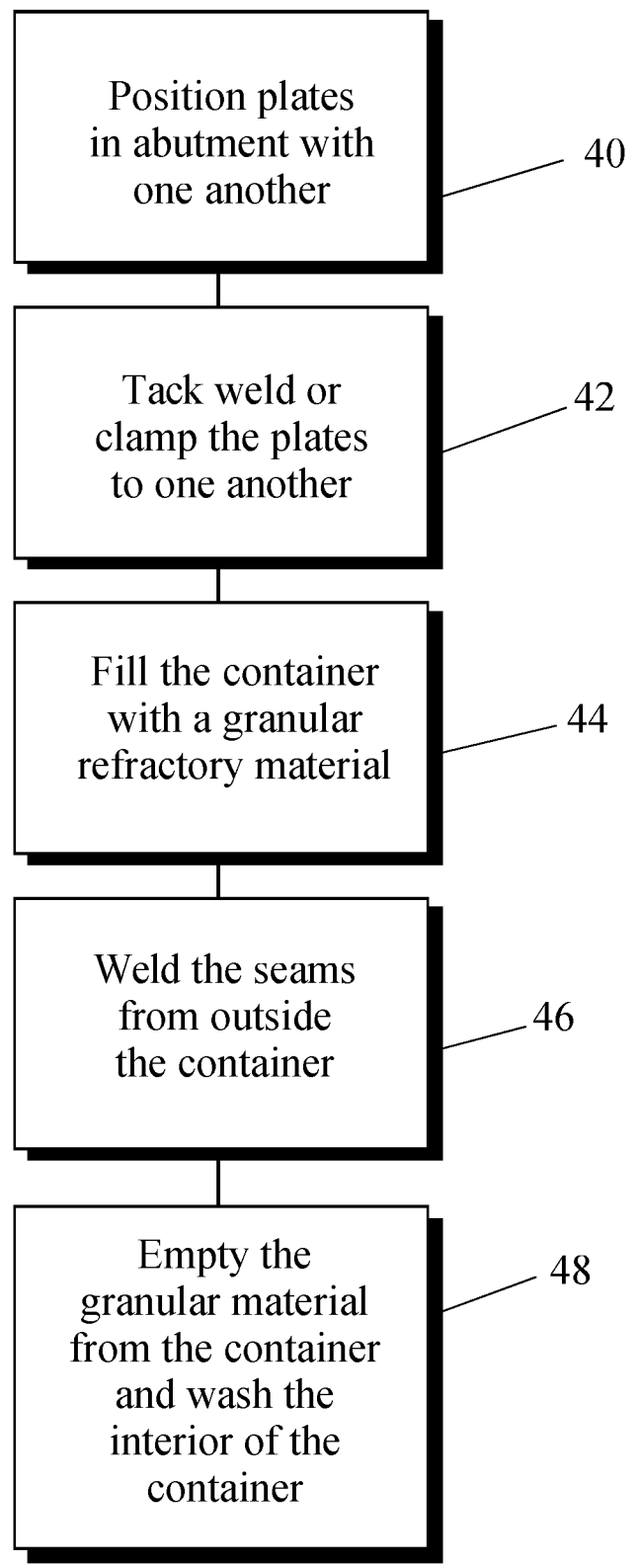
FIG. 4 is a flow chart showing the steps performed in manufacturing method in accordance with an embodiment of the invention.

Thus, as shown in the flow chart of FIG. 4, in a first step 40 of manufacturing container plates are positioned in abutment with one another to define the walls of the container. The plates may be individual plates, held in a suitable jig, of they may, as previously described, be parts that are bent about of a flat metal blank.

In step 42, the plates are firmly secured to one another to allow the container to withstand being filled. This may involve tack welding or clamping the plates to one another.

Clamping of extra parts, that have not to be welded, may make the interior more suitable to receive/remove granular refractory material 30.

Next, in step 44, the container is filled entirely with granular refractory material 30, preferably marble chips having a particle size of 3 mm to 4 mm, as shown in FIG. 3 penetrate tightly into the corners so as to prevent burring from taking place during welding of the seams.

In step 46, the seams 16 are welded, using arc welding (MIG or TIG) or oxy-acetylene welding. The presence of the marble chips within the container avoids the welding defects described above by reference to FIG. 2 and also results in the plates cooling down more rapidly after the welding is completed.

In some occasions re-orientation of the container during welding is advisable or even required. The marble chips have to penetrate the seams 16 tightly over the entire length of the weld in order to better limit the creation of burr 20 and reduce the porosity.

Further, re-orienting the container may avoid having to close openings to reduce or avoid leakage of the marble chips while welding.

Further, re-orienting the container may allow the container to be filled only partially but nevertheless welding all seams 16 covered by marble chips and thus avoiding spatter 22, burr 20 and porosity issues. However, partially filling the container may increase the cooling down time.

In the final step 48, the granular material is emptied from the container for recycling and the container is washed to remove any traces of the granular material from the container.

The method of the invention has been found to produce welds of improved quality, with less porosity, less burring and no spatter thereby avoiding the need to remove defects from the interior of the container. Aside from producing containers of higher quality the invention also reduces manufacturing time and thereby provides a cost saving.

The invention claimed is:

1. A method of manufacturing a container, the method comprising:
    positioning metal plates against one another to define an interior space;
    filling the interior space with a granular marble material such that the container is entirely filled with the granular marble material to prevent at least one of weld spatter from adhering to an interior of the container or burrs from being created at one or more seams defined between the metal plates; and
    welding the one or more seams between the metal plates, a portion of the granular marble material being in direct contact with the one or more seams during welding.

2. A method as claimed in claim 1, wherein granules of the granular marble material are rounded.

3. A method as claimed in claim 1, wherein granules of the granular marble material are angular.

4. A method as claimed in claim 1, wherein granules of the granular marble material have a diameter in the range from 3 mm to 4 mm.

5. A method as claimed in claim 1, wherein the metal plates are made from steel.

6. A method as claimed in claim 1, wherein the metal plates form a fluid tight container.

7. A method as claimed in claim 1, wherein the container is re-oriented during welding such that the granular marble material contacts the one or more seams.

* * * * *